B. J. FINNEGAN.
BOTTLE.
APPLICATION FILED OCT. 28, 1919.
1,336,737.
Patented Apr. 13, 1920.
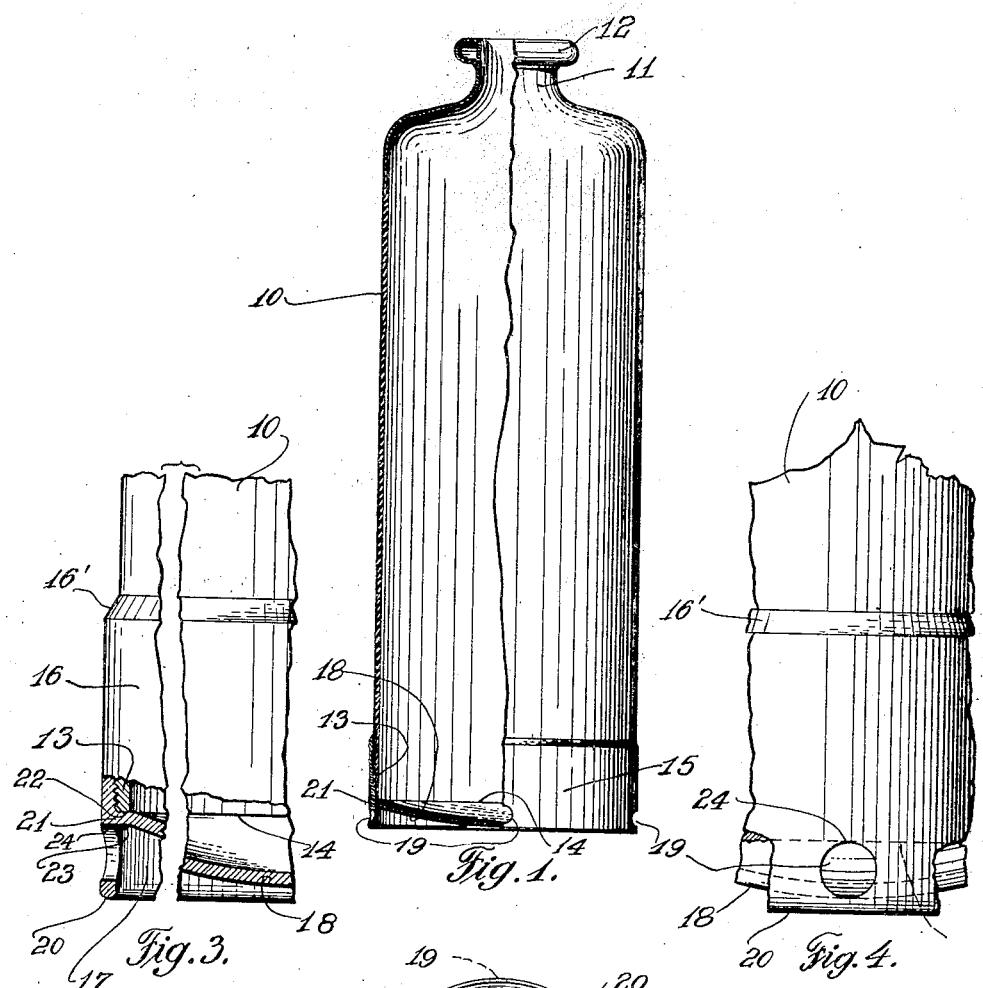

UNITED STATES PATENT OFFICE.

BERNARD JAMES FINNEGAN, OF NEW YORK, N. Y.

BOTTLE.

1,336,737. Specification of Letters Patent. Patented Apr. 13, 1920.

Application filed October 28, 1919. Serial No. 333,907.

*To all whom it may concern:*

Be it known that I, BERNARD J. FINNEGAN, citizen of the United States, and resident of New York, in the county of New York and State of New York, have invented certain new and useful Improvements in Bottles, of which the following is a specification.

This invention relates to bottles.

The objects of my invention are to provide a sanitary, simple, inexpensive and practical article of manufacture which will fill the demand for a perfect nursing bottle.

The foregoing and other objects will be more fully apparent from the following description and the accompanying drawings, forming part of this specification, in which:

Figure 1 is an elevation of my invention, partially in section.

Fig. 2 is the bottom view of same.

Figs. 3 and 4 are detail views showing the arrangement of the bottle base.

Referring to the figures, my device comprises a cylindrical container 10 made preferably of aluminum or other light, rust-proof and sanitary material. One end of this container is provided with a short, abruptly flaring or shortly widened neck 11 which terminates into a broad flange 12 over which a nipple may be slipped.

The other end of the bottle is threaded at its outer wall as indicated at 13 and possesses a straight bottom face 14.

A cylindrical base or bottom member 15 closes the lower or wide part of the container and serves not only for a rest but is constructed in such a way as to permit the escape of steam formed beneath the container when heated in a vessel of boiling water. There may be employed different ways of construction, for instance ribs with inclined grooves forming the base rest or conically or wedge formed bottoms surrounded by annular rims and escapes provided in the rims. A preferred form is shown in the drawings. The base member is divided into larger base portion 16 and a smaller portion 17 through a spherical head 18, forming such inclined surface for diverting steam. The larger portion 16 is threaded at its inner wall for receiving the threaded part of the container.

The end of the larger base-portion is tapered to form a smooth connection with the container body. The lower base-portion 17 is provided with a plurality of apertures 19 and has a rounded edge 20 upon which it may be rested. The spherical head 18 is provided with an annular rim 21.

The inner face 22 of the rim is made sufficiently wide to allow the straight face 14 of the container to rest upon and bear against the rim, thus assuring a leak-proof connection between container and base without the use of washers.

The outer rim face 23 of the head is made in such a way as to aline with the edge portion 24 of the apertures 19 adjacent or nearest to the larger threaded part 16 of the base 15.

The spherical head 18 is of lesser height than the shorter base portion 17, thus a free space is provided between the bottom of a water filled vessel in which the bottle is usually heated and the head 18. The steam bubbles forming in the vessel directly beneath the bottle have room for their expansion and the steam is permitted to escape along the spherical head and through the apertures 19 from beneath the bottle. Thus the steam is deflected and prevented from lifting or shaking the bottle, and its contents from spilling while being heated. The rounded edge 20 of the base assures limited contact with the object upon which the container is placed and gives it greater stability than it would have if a solid, flat or the commonly known concave base would be used.

My device, as above described, represents a sanitary unbreakable bottle, which may be easily cleansed, carried, heated in boiling water, without damaging the container. It may be safely handled without injury to persons or children, and above all it can be cheaply manufactured.

It is understood that details of construction may be changed and improvements made without departing from the scope of my idea.

Having thus described my invention, I claim:

1. A bottle comprising a cylindrical main body provided at its broad end with an externally threaded portion, a cylindrical base for closing the broad end of the bottle having an internally threaded portion corresponding with the threaded portion of the bottle, apertures provided at the unthreaded end of the base, a spherical head having a flattened rim provided within said unthreaded end and being of lesser height than the latter, said flattened portion terminating at the upper edge of said apertures.

2. A cylindrical bottle having at one end a short, abruptly formed neck, its other end being threaded outwardly, a cylindrical base member threaded inwardly for receiving the threaded portion of the bottle, a spherical bottom dividing said base-member, apertures provided in the latter, communicating with the space surrounding the convex portion of the bottom.

3. In combination with a cylindrical container having a short, abruptly flaring neck, a cylindrical base member comprising an inwardly threaded larger portion and smooth smaller portion, a spherical head dividing said portions and having a flattened annular rim connecting internally with the base member, said head being of lesser height than the smaller base portion, apertures provided in said smaller base portion said rim alining with the edge portion of the apertures adjacent to the larger base portion.

Signed at New York city, in the county of New York, and State of New York, this 22d day of October, A. D. 1919.

BERNARD JAMES FINNEGAN.